Oct. 20, 1970  J. R. KITTRELL  3,535,227
HYDROCARBON CONVERSION CATALYST COMPRISING AN ULTRA-STABLE
CRYSTALLINE ZEOLITIC MOLECULAR SIEVE COMPONENT, AND
METHODS FOR MAKING AND USING SAID CATALYST
Filed Sept. 13, 1968

INVENTOR
JAMES R. KITTRELL
BY R. H. Davies
ATTORNEY

United States Patent Office 3,535,227
Patented Oct. 20, 1970

3,535,227
HYDROCARBON CONVERSION CATALYST COMPRISING AN ULTRA - STABLE CRYSTALLINE ZEOLITIC MOLECULAR SIEVE COMPONENT, AND METHODS FOR MAKING AND USING SAID CATALYST
James R. Kittrell, El Cerrito, Calif., assignor to Chevron Research Company, San Francisco, Calif., a corporation of Delaware
Filed Sept. 13, 1968, Ser. No. 759,623
Int. Cl. C10g *13/04;* B01j *11/26*
U.S. Cl. 208—59
24 Claims

ABSTRACT OF THE DISCLOSURE

A hydrocarbon conversion catalyst consisting essentially of: (A) an ultra-stable crystalline zeolitic molecular sieve component substantially free of any catalytic loading metal; and (B) a gel matrix consisting essentially of (a) at least one component selected from Group VIII components and compounds thereof and combinations of Group VIII hydrogenating components and compounds thereof with tin and compounds thereof; and (b) a gel selected from silica-alumina gel, silica-alumina-titania gel and silica-alumina-zirconia gel; and processes using said catalyst.

INTRODUCTION

Figure 1:
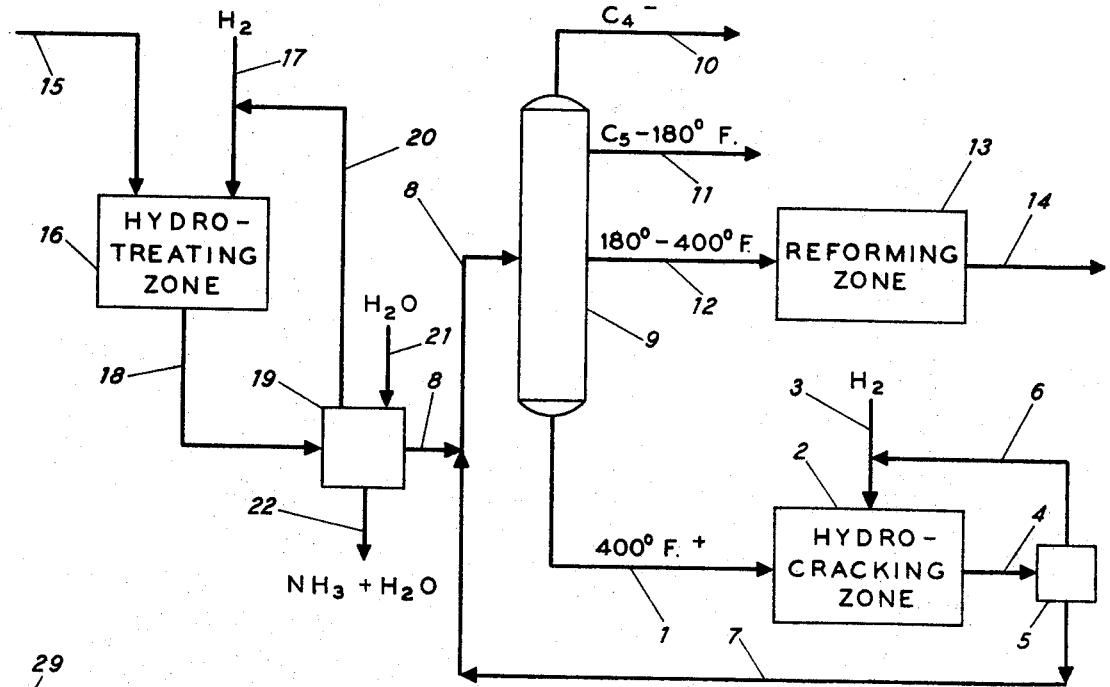

This invention relates to catalytic hydrocracking of petroleum distillates and solvent-deasphalted residua to produce high-value fuel products including gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include: U.S. Pat. 3,140,251; U.S. Pat. 3,140,253; British Pat. 1,056,301; French Pat. 1,503,063; and French Pat. 1,506,793.

There has been a continuing search for further improvements in such catalysts, and in similar multi-component catalysts, particularly for hydrocracking uses.

It is known from the paper "A New Ultra Stable Form of Faujasite," by C. V. McDaniel and P. K. Maher, of Washington Research Centre, Davison Division, W. R. Grace & Co., Clarksville, Md., presented at Molecular Sieve Conference, Society of Chemical Industry, London, England, April 1967, and from the published preprint of said paper, that ultra-stable faujasites with a sodium content below about 3 weight percent, calculated as $Na_2O$, may be prepared that have a substantially higher temperature of faujasite structure collapse than previously known forms of faujasite having a correspondingly low sodium content. The paper indicates that as sodium is removed from the sodium form of faujasite, a critical point is reached at around 3 weight percent $Na_2O$, after which previously known forms of faujasite suffer structural collapse at temperature levels that decrease rapidly as additional sodium is removed. For example, the previously known type "Y" faujasites were structurally stable at a temperature of about 850° C. at a sodium content level of about 3.2 weight percent, calculated as $Na_2O$, but further sodium removal resulted in a marked decrease in structural thermal stability, to the extent that when the sodium level was reduced to about zero, the structural collapse temperature had dropped to about 600° C. The paper further indicates that the ultra-stable zeolites prepared by the procedures given in the paper have increasing structural thermal stability as the sodium level is reduced below about 3 weight percent $Na_2O$, to the extent that when the sodium level is reduced to about zero, the structural collapse temperature exceeds 1000° C. The paper further indicates that the unit cell size of the ultra-stable faujasites, containing less than about 3 weight percent sodium, calculated as $Na_2O$, is less than that of the corresponding previously known unstabilized faujasites, due to cell shrinkage as sodium is removed and the faujasites are subjected to the other preparation procedures given in the paper. The differences in unit cell size in angstroms between the low-sodium-content ultrastable faujasites and the previously known unstabilized faujasites, for various faujasite silica-alumina ratios, is given in the paper by the following curves:

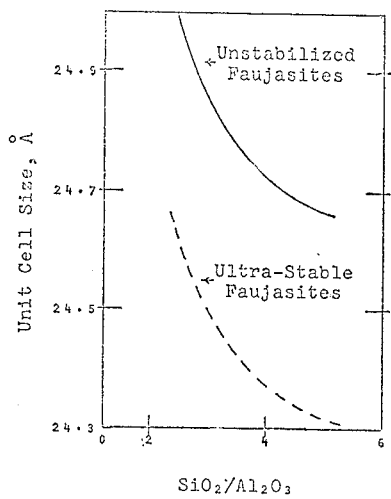

From the foregoing, it will be seen that faujasites defined as having a silica/alumina ratio above about 2.15, a unit cell size below about 24.65, and a sodium content below about 3 weight percent, calculated as $Na_2O$, are ultrastable faujasites, and that the previously known unstabilized faujasites fall outside this definition. Accordingly, as used herein, the term "ultra-stable" as applied to various crystalline zeolitic molecular sieves means that the molecular sieves referred to have:

(a) a silica/alumina ratio above about 2.15, and
(b) a unit cell size below about 24.65 angstroms, and
(c) a sodium content below about 3 weight percent, calculated as $Na_2O$.

It is known that various kinds of catalysts may be dried and calcined, for example at a temperature of 800°–1000° F., and then subjected to a further activation treatment (hereinafter called "thermactivation") at a higher temperature, to enhance various properties of the catalysts. Whether a thermactivation treatment will have any efficacy at all, and if so what the thermactivation temperature should be, are functions of the particular catalyst composition involved, and the use to which it will be applied. These matters to a large extent are empirical. In the case of the catalysts of the present invention, it has been found that thermactivation in a particular temperature range indeed does enhance various properties of the catalysts. The catalysts of the present invention contain ultra-stable crystalline zeolitic molecular sieves. Thermactivation of catalysts that are identical with the catalysts of the present invention except that contain unstabilized crystalline zeolitic molecular sieves instead of ultra-stable crystalline zeolitic molecular sieves can enhance various properties of such catalysts, subject, however, to: (a) severe limitations on the extent to which the thermactivation temperatures can be elevated, because of the danger of at least partial structural collapse or degradation of the molecular sieve components; and (b) resulting proscription from thermactivation temperature levels at which various catalyst properties can be optimized.

OBJECTS

In view of the foregoing, objects of the present invention include providing an improved hydrocracking catalyst that has, compared with similar prior art catalysts:

(1) high hydrocracking activity;
(2) high nitrogen tolerance;
(3) high hydrocracking stability; and
(4) improved high-temperature structural stability, with resulting improved amenability to high-temperature thermactivation.

It is a further object of the present invention to provide a hydrocracking process using said improved catalyst that is capable of producing excellent-quality gasoline and other valuable fuel products, and to provide methods of operating the hydrocracking process in an integrated manner with other process units to achieve various advantageous results.

The present invention will best be understood, and further objects and advantages thereof will be apparent, from the following description when read in connection with the accompanying drawing.

DRAWING

In the drawing, FIG. 1 is a diagrammatic illustration of apparatus and flow paths suitable for carrying out the process of several of the embodiments of the present invention, including embodiments wherein a hydrofining zone precedes the hydrocracking zone, and embodiments wherein a selected fraction from the hydrocracking zone is catalytically reformed.

Figure 2:
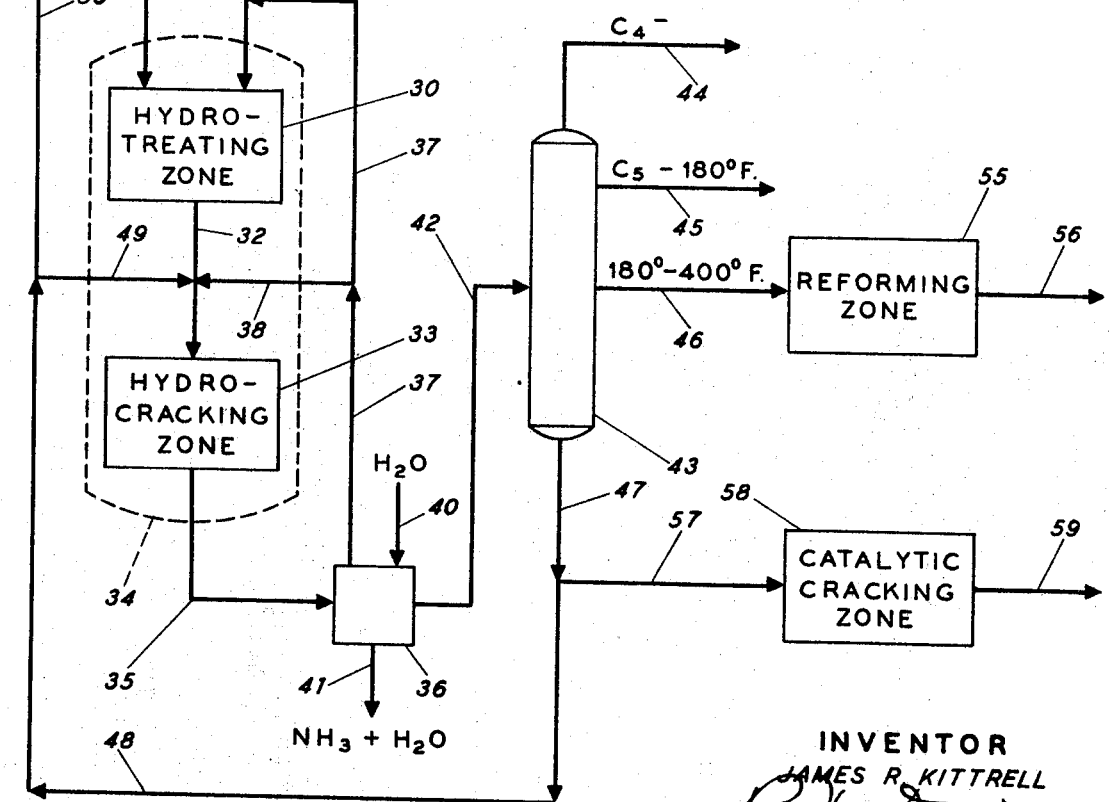

FIG. 2 is a diagrammatic illustration of apparatus and flow paths suitable for carrying out the process of additional embodiments of the present invention, including embodiments wherein a hydrofining zone precedes a hydrocracking zone in a single reactor shell, and embodiments wherein a selected fraction from the hydrocracking zone is catalytically cracked.

STATEMENT OF INVENTION

In accordance with the present invention, it has been found that the foregoing objects are achieved by a hydrocarbon conversion catalyst consisting essentially of a unique combination of catalytic components, including a silica-containing gel, a component selected from Group VIII components and compounds thereof and combinations of Group VIII components and compounds thereof with tin and compounds thereof, and an ultrastable crystalline zeolitic molecular sieve component that is substantially in the ammonia or hydrogen form and that is substantially free of any catalytic loading metal or metals.

Said ultra-stable crystalline zeolitic molecular sieve component preferaby is an "X" type or "Y" type faujasite, modified to an ultra-stable form, as defined herein.

More particularly, in accordance with the present invention there is provided a hydrocarbon conversion catalyst consisting essentially of:

(A) A gel matrix consisting essentially of: (a) a gel selected from silica-alumina gel, silica-alumina-titania gel and silica-alumina-zirconia gel; and (b) at least one hydrogenating component selected from Group VIII metals and compounds thereof and combinations of Group VIII metals and compounds thereof with tin and compounds thereof; and (B) A crystalline zeolitic molecular sieve substantially in the ammonia or hydrogen form, substantially free of any catalytic loading metal or metals, said molecular sieve further having a silica/alumina ratio above about 2.15, a unit cell size below about 24.65 angstroms and a sodium content below about 3 weight percent, calculated as $Na_2O$, said molecular sieve further being in particulate form and being dispersed through said matrix; said catalyst further being characterized by an average pore diameter below 100 angstroms and a surface area above 200 square meters per gram.

Said matrix desirably will contain at least 15 weight percent silica, and sufficient alumina to provide an alumina-to-silica weight ratio of 15/85 to 80/20.

Said molecular sieve may be present in an amount of 1 to 50 weight percent, based on said catalyst.

When said matrix includes a silica-alumina-titania gel or a silica-alumina-zirconia gel, the titania or zirconia may be present in an amount of 1 to 15 weight percent of said matrix, calculated as metal.

When said matrix includes tin or a compound thereof, the tin or compound thereof may be present in an amount of 1 to 30%, preferably 2 to 15%, by weight, calculated as metal and based on the total catalyst. When tin is present in the catalyst together with nickel, then compared with the same catalyst with no tin present: (a) the hydrocracking activity is higher; (b) the hydrogenation activity is higher, and (c) the hydrogenation activity can be controlled in an essentially reversible manner by varying the amount of sulfur present in the hydrocarbon feed.

Said Group VIII hydrogenating component may be, for example, nickel, cobalt, platinum or palladium, in the form of the metal, oxide, sulfide or any combination thereof. Said hydrogenating component may be present in an amount of 0.01 to 15 weight percent, preferably 0.01 to 10 weight percent, based on said catalyst and calculated as metal. When said Group VIII hydrogenating component is nickel, cobalt or compounds thereof, preferably it will be present in an amount of at least 5 weight percent, based on said catalyst and calculated as metal. When said Group VIII hydrogenating component is platinum or palladium or compounds thereof, preferably it will be present in an amount of less than 5 weight percent, more preferably less than 3 weight percent, based on said catalyst and calculated as metal.

The Group VIII hydrogenating component and tin are catalytic metals, and the zirconium or titanium, when used, is not, and sodium is not, within the meaning of the term "catalytic loading metal or metals," as used herein. The reference herein to a crystalline zeolitic molecular sieve "substantially free of any catalytic loading metal or metals" means that the nickel, cobalt and tin content of the molecular sieve component is no more than 0.5 weight percent and the platinum and palladium content of the molecular sieve component is no more than 0.1 weight percent, based on the molecular sieve component.

It will be noted that the weight ratio of catalytic metal in the matrix portion of the catalyst to catalytic metal in the molecular sieve portion of the catalyst is high, in the catalysts of the present invention.

Another particular embodiment of the catalyst of the present invention is a catalyst consisting essentially of:

(A) A porous Xerogel consisting essentially of: (a) at least 15 weight percent silica; (b) alumina, in an amount providing an alumina-to-silica weight ratio of 15/85 to 80/20; (c) nickel, in the form of the metal, oxide, sulfide or any combination thereof, in an amount of 0.01 to 15 weight percent of said Xerogel, calculated as metal; and (d) titanium oxide, in an amount of 1 to 10 weight percent of said Xerogel, calculated as metal;

(B) A crystalline zeolite molecular sieve, substantially in the ammonia or hydrogen form, substantially free of any catalytic loading metal or metals, in an amount of 1 to 50 weight percent of said catalyst, said molecular sieve having a silica/alumina ratio above about 2.15, a unit cell size below about 24.65 angstroms and a sodium content below about 3 weight percent, calculated as $Na_2O$, said molecular sieve being in the form of particles, said particles being dispersed through said Xerogel; said catalyst having an average pore diameter below 100 angstroms and a surface area above 200 square meters per gram.

Further in accordance with the present invention, it has been found that the catalysts of the present invention, containing ultra-stable crystalline zeolitic molecular sieves, are unique in that following drying and calcination thereof, or following drying and thermactivation thereof, if said catalysts are subjected to the thermactivation procedure described herein, they are amenable to a marked activity increase by the addition of water thereto. It has been found that the drying and calcination, or drying and thermactivation procedures dehydrate the ultra-stable crystalline zeolitic molecular sieve components of the catalysts, which require rehydration at least in part to optimize the activities of these components. It has been found that said activities are optimized if rehydration is accomplished after the calcination or thermactivation step, to the extent that at least 0.1, preferably 0.1 to 1.0, ml. of water per gram of the ultra-stable crystalline zeolitic molecular sieve component is combined with the total catalyst. Accordingly, in accordance with preferred embodiments of the present invention, said catalysts, following calcination or thermactivation thereof, are rehydrated by combining with them at least 0.1, preferably 0.1 to 1.0, ml. of water per gram of ultra-stable crystalline zeolitic molecular sieve component contained therein. Even more preferably, said catalysts are maintained in said rehydrated state during at least the major portions of the on-stream periods while being used in the process of the present invention.

Further in accordance with the present invention, there is provided a hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst described above, at hydrocracking conditions, including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of said feedstock, and recovering from said reaction zone valuable products, including gasoline. The hydrocarbon feedstock preferably contains less than 1000 p.p.m. organic nitrogen. A prior hydrofining step may be used, if desired, to reduce the feed nitrogen content to the preferred level; however, because of the superior nitrogen tolerance of the molecular sieve component, compared with silica-alumina gel, the hydrofining step need not accomplish complete nitrogen content reduction, as further discussed hereinafter.

Further in accordance with the present invention, advantageous results are obtained by providing in the reaction zone, in addition to said catalyst comprising an ultra-stable molecular sieve component, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate second catalyst may be located in said reaction zone in a bed disposed above said catalyst comprising an ultra-stable molecular sieve component. In the embodiments of the present invention discussed in this paragraph, no other prior hydrofining step generally will be necessary, because hydrofining is accomplished in one reaction zone concurrently with hydrocracking, together with some hydrogenation of aromatics.

Still further in accordance with the present invention, there is provided a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed comprising the ultra-stable molecular sieve-containing catalyst of the present invention, maintaining said first bed of catalyst and said second bed of catalyst at a temperature in the range 400° to 950° F. and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing a catalyst comprising an ultra-stable crystalline zeolite molecular sieve component in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanined by some hydrocracking, before being supplied to the hydrocracking zone containing the catalyst comprising an ultra-stable crystalline zeolitic molecular sieve.

NITROGEN CONTENT OF FEEDSTOCK

While the process of the present invention can be practiced with utility when supplying to the hydrocracking zone containing the catalyst comprising an ultra-stable crystalline zeolitic molecular sieve component, hydrocarbon feeds containing relatively large quantities of organic nitrogen, for example several thousand parts per million organic nitrogen, it is preferred that the organic nitrogen content be less than 1000 parts per million organic nitrogen. A preferred range is 0.1 to 1000 parts per million; more preferably, 0.1 to 100 parts per million. As previously discussed, a prior hydrofining step may be used, if desired, to reduce the feed nitrogen to the preferred level.

The prior hydrofining step advantageously may also accomplish hydrogenation and a reasonable amount of hydrocracking. Because of the superior tolerance for organic nitrogen compounds of the ultra-stable molecular sieve component of the catalyst of the present invention compared with silica-alumina gel, the hydrofining step need not accomplish complete organic nitrogen content reduction. Further, because of the superior tolerance of the ultra-stable molecular sieve component for ammonia, compared with silica-alumina gel, and because the ultra-stable molecular sieve component is more tolerant of ammonia than of organic nitrogen compounds, ammonia produced in the hydrofining zone either may be removed from the system between the hydrofining zone and the hydrocracking zone containing the hydrocracking catalyst comprising an ultra-stable molecular sieve component, or may be permitted to pass into the hydrocracking zone along with the feed thereto.

SULFUR CONTENT OF FEEDSTOCKS

While the process of the present invention can be practiced with utility when supplying to the hydrocracking zone containing a catalyst comprising an ultra-stable molecular sieve component, hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING AN ULTRA-STABLE CRYSTALLINE ZEOLITIC MOLECULAR SIEVE COMPONENT AND PREPARATION THEREOF

(A) General

The ultra-stable crystalline zeolitic molecular sieve component of the catalyst of the present invention may be an ultra-stable modification of any type of crystalline zeolitic molecular sieve that is known in the art as a useful component of a conventional hydrocracking catalyst containing a crystalline zeolitic molecular sieve component. A decationized molecular sieve cracking component is preferred. Especially suitable are ultra-stable faujasite, particularly ultra-stable "Y" type and "X" type faujasite, in the ammonia or hydrogen form.

(B) Method of preparation

The molecular sieve component of the catalyst, prior to being converted to an ultra-stable form, may be prepared by any conventional method known in the art. The molecular sieve component so prepared may be converted to the ultra-stable form by the methods set forth in said McDaniel and Maher paper.

The ultra-stable molecular sieve component may be dispersed in a matrix of the other catalyst components by cogelation of said other components around said ultra-stable molecular sieve component in a conventional manner.

The ultra-stable molecular sieve component, substantially in the ammonia or hydrogen form, may be maintained substantially free of any catalytic loading metal or metals, as required by the present invention, by dispersing the molecular sieve component in a slurry of the precursors of the other catalyst components at a pH of 5 or above, and accomplishing filtration of the slurry before 5 hours have elapsed, and preferably before 3 hours have elapsed.

The catalyst, in hydrogel form, is dried in a conventional manner, and then desirably is thermactivated in an oxygen-containing gas stream for 0.25 to 48 hours at 900° to 1600° F., preferably 0.25 to 48 hours at 1200° to 1500° F., and more preferably 2 to 8 hours at 1200° to 1500° F. The oxygen-containing gas stream, which may be air, preferably is as dry as practicable. The improved results obtainable by thermactivation in the indicated manner are optimized as the gas stream becomes extremely dry; although for most practical purposes the gas stream need be only as dry as ambient air, greater dryness is preferred. Those skilled in the art will be aware of various methods for drying the gas stream to any desired extent.

Although said thermactivation procedure is applicable to activation of catalysts of the aforesaid type having a wide range of silica contents, it is especially useful with such catalysts that contain less than 40 weight percent silica in the total catalyst, and less than 35 weigh percent silica in the matrix.

The finished catalyst may be sulfided in a conventional manner prior to use, if desired, if not presulfided, the catalyst will tend to become sulfided during process operation from any sulfur content that may be present in the hydrocarbon feed.

SEPARATE HYDROFINING CATALYST

(A) General

As previously indicated, advantageous results are obtained by providing in the reaction zone containing the hydrocracking catalyst comprising an ultra-stable molecular sieve component a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with the hydrocracking catalyst comprising an ultra-stable molecular sieve component, but preferably are disposed in a separate catalyst bed located ahead of the hydrocracking catalyst in the same reactor shell, eliminating interstage condensation, pressure letdown and ammonia and hydrogen sulfide removal. In a preferred arrangement using downflow of hydrocarbon feed, the bed of separate second catalyst is located above the hydrocracking catalyst in the same reactor shell.

Where said separate second catalyst is located in the same reactor shell as the hydrocracking catalyst containing an ultra-stable molecular sieve component, it is preferably present in an amount in the range of 10 to 40 volume percent of the total amount of catalyst in the reactor.

In an arrangement less preferred than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor containing a hydrocracking catalyst comprising an ultra-stable molecular sieve component.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia, and hydrogen sulfide.

Preferably, said separate second catalyst contains nickel or cobalt or compounds thereof in an amount of 1 to 15 weight percent, calculated as metal, and molybdenum or tungsten or compounds thereof in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

| | Percent by weight of total catalyst, calculated as metal | | | SiO₂/Al₂O₃ weight ratio |
|---|---|---|---|---|
| | Ni | Mo | W | |
| (1) | 4–10 | 15–25 | | 10/90–30/70 |
| (2) | 6–15 | | 15–30 | 30/70–50/50 |

It has been found that use of said separate second catalyst increases the gasoline yield from the hydrocracking stage containing a catalyst comprising an ultra-stable molecular sieve component, compared with the gasoline yield from the hydrocracking stage when the identical feed thereto has not been first or concurrently processed in the presence of said separate second catalyst. The increased gasoline yield probably is related to the hydrogenation, in that more saturated hydrocarbon structures tend to crack more easily.

(B) Method of preparation

Said separate second catalyst may be prepared by any conventional preparation method, including impregnation of an alumina or silica-alumina support with salts of the desired hydrogenating component, or cogelation of all components, with the latter method being preferred.

The hydrocracking catalyst comprising an ultra-stable molecular sieve component has activity and stability advantages over a conventional hydrocracking catalyst. It has been found that use of said separate second catalyst in the above-described arrangements further increases the stability of the hydrocracking catalyst containing an ultra-stable molecular sieve component, compared with the stability of the latter catalyst when the identical feed thereto has not been first or concurrently processed in the presence of said separate second catalyst.

OPERATING CONDITIONS

The hydrocracking zone containing the catalyst comprising an ultra-stable molecular sieve component is operated at hydrocracking conditions including a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

Where a separate hydrofining zone, which also may accomplish hydrogenation and some hydrocracking, is located ahead of the hydrocracking zone containing a catalyst containing an ultrastable molecular sieve component, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the hydrocracking catalyst containing an ultrastable molecular sieve component in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains a hydrocracking catalyst consisting of an ultrastable molecular sieve component substantially free of any catalytic loading metal, dispersed in a gel matrix consisting of a silica-alumina gel and a nickel hydrogenation component. As previously discussed, a separate second catalyst, previously described, may be located in hydrocracking zone 2. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, a $C_5$—180° F. fraction which is withdrawn through line 11, and a 180°–400° F. fraction which is withdrawn through line 12.

Still referring to FIG. 1, in accordance with another embodiment of the present invention, the 180°–400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of a hydrocracking catalyst consisting of an ultrastable molecular sieve component substantially free of any catalytic loading metal, dispersed in a gel matrix consisting of a silica-alumina gel and a nickel hydrogenating component. A separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4^-$ fraction which is withdrawn through line 44, a $C_5$—180° F. fraction which is withdrawn through line 45, a 180°–400° F. fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are given by way of exemplification only, and are not intended in any way to limit the scope of the present invention.

EXAMPLE 1

A cogelled catalyst (catalyst A) of the following composition is prepared.

| Component: | Wt. percent of total catalyst |
|---|---|
| NiO | 11.4 |
| $ZrO_2$ | 9.0 |
| $Al_2O_3$ | 27.0 |
| $SiO_2$ | 42.6 |
| Ultra-stable crystalline zeolitic molecular sieve, "Y" form | 10.0 |
| Total | 100.0 |

The catalyst is prepared by the following steps, using sufficient quantities of the various starting materials to produce the above-indicated weight percentages of the components of the final catalysts:

(1) An aqueous acidic solution is prepared, containing $AlCl_3$, $ZrOCl_2$, $NiCl_2$ and acetic acid.

(2) Two alkaline solutions are prepared: (1) a sodium silicate solution; and (2) an ammonia solution containing sufficient excess ammonia so that upon combining the alkaline solutions with the acidic solution coprecipitation of all of the metal-containing components would occur at a neutral pH of about 7.

(3) The acidic and alkaline solutions are combined, and coprecipitation of all of the metal-containing components of the solutions occurs at a pH of about 7, resulting in a slurry.

(4) An ultra-stable ammonium "Y" crystalline zeolitic molecular sieve in finely divided form is added to the slurry.

(5) The molecular-sieve containing slurry is filtered, within 3 hours from the time of sieve addition, to produce a molecular sieve-containing hydrogel filter cake, which is washed repeatedly with dilute ammonium acetate solution, to further remove sodium and chloride ionic impurities from both the hydrogel and the molecular sieve contained therein.

(6) The molecular sieve-containing hydrogel is dried in an air-circulating oven and then is activated in flowing air for approximately 3 hours at 1350° F., and then is activated in flowing air for 2 hours at 1250° F.

The finished catalyst is characterized by a surface area of about 400 m.$^2$/g., a pore volume of about 0.35 cc./g., an average pore diameter of about 35 angstroms, and an ultra-stable molecular sieve component substantially free of catalytic metals; that is, substantially all of the nickel in the catalyst is located in the gel portion of the catalyst rather than in the ultra-stable molecular sieve component thereof.

EXAMPLE 2

A cogelled catalyst (catalyst B, a comparison catalyst) is prepared as in Example 1, except that prior to incorporation in the slurry the ultra-stable molecular sieve is presoaked in an ammoniacal solution of $NiCl_2$, to load the molecular sieve with nickel. The amounts of starting materials are selected to provide a final catalyst containing the same weight percentages of components as the catalyst of Example 1.

The catalyst differs from the catalyst of Example 1 only in that the nickel contained therein is located both in the gel component and in the molecular sieve component.

EXAMPLE 3

A cogelled catalyst (catalyst C, a comparison catalyst) of the following composition is prepared.

| Component: | Wt. percent of total catalyst |
|---|---|
| NiO in gel component | 8.9 |
| NiO in sieve component | 1.3 |
| $Al_2O_3$ | 21.0 |
| $SiO_2$ | 40.1 |
| Ultra-stable crystalline zeolitic molecular sieve, "Y" form | 28.7 |
| Total | 100.0 |

The catalyst is prepared as in Example 1, except that prior to incorporation in the slurry the ultra-stable molecular sieve is presoaked in a dilute solution of $NiCl_2$, whereby the ultra-stable molecular sieve is loaded with nickel in an amount which results in the aforesaid amount of NiO associated with the ultra-stable molecular sieve in the final catalyst.

EXAMPLE 4

Portions of catalysts A and C of Examples 1 and 3, respectively, are separately used to hydrocrack separate portions of a mildly hydrofined California cycle oil feedstock, on a once-through basis.

The cycle oil feedstock has the following characteristics:

| | |
|---|---|
| Boiling range, ° F. | 350–700 |
| Gravity, ° API | 30.2 |
| Aniline point, ° F. | 105 |
| Organic nitrogen content, p.p.m. | 20 |

The hydrocracking conditions were:
Total pressure, p.s.i.g. _____ 1600
Total hydrogen rate, s.c.f./bbl. _____ 1800
Liquid hourly space velocity, V/V/hr. _____ 2.0
Per-pass conversion to products boiling below 400°
  F., vol. percent _____ 60
Starting temperature, ° F. As indicated below.

The hydrocracking activities of the two catalysts, as measured by the starting temperatures necessary to achieve the indicated per-pass conversion, and the fouling rates of the two catalysts, as indicated by the hourly rise in temperature necessary to maintain the indicated per-pass conversion, are:

|  | Catalyst A | Catalyst C |
|---|---|---|
| Starting T, ° F | 654 | 655 |
| Fouling rate, ° F./hr | 0.03 | 0.05 |

Catalyst B is used to hydrocrack the same feedstock, at the same conditions. The results are:

Catalyst B
Starting T, ° F. _____ 665
Fouling rate, ° F./hr. _____ 0.03

From the foregoing examples, it may be seen that catalyst A, containing an ultra-stable molecular sieve component substantially free of catalytic metal, has a lower fouling rate and a lower starting temperature than comparison catalyst C, and that its starting temperature is considerably lower than that of comparison catalyst B.

EXAMPLE 5

The catalyst of Example 1 is used to hydrocrack a light cycle oil hydrocarbon efedstock of the following description:

Gravity, ° API _____ 19.5
Aniline point, ° F. _____ 62
Sulfur content, weight percent _____ 0.43
Nitrogen content, p.p.m. _____ 330
Aromatics content, liquid volume percent _____ 70
Boiling range, ASTM D-1160 distillation:
  ST/5 _____ 381/471
  10/30 _____ 492/532
  50 _____ 568
  70/90 _____ 598/635
  95/EP _____ 648/681

The hydrocracking is accomplished on a once-through basis, at an average catalyst temperature of 735° F., a pressure of 2100 p.s.i.g., a liquid hourly space velocity of 0.9, and a hydrogen supply rate of 12,000 s.c.f. per barrel of hydrocarbon feedstock. The hydrogen consumption is 2000 s.c.f. per barrel of hydrocarbon feedstock.

The product distribution is as follows:

Wt. percent
$C_1$ _____ 0.1
$C_2$ _____ 0.3
$C_3$ _____ 2.8
$iC_4$ _____ 4.6
$nC_4$ _____ 4.4
$C_5$—180° F. _____ 11.0
180°–400° F. _____ 34.0
400° F.+ _____ 46.0

The 180°–400° F. portion of the product is characterized by a gravity of 40° API and by a paraffin/naphthene/aromatic ratio of 15/35/50.

The 400° F.+ portion of the product is characterized by a gravity of 30° API and by an aniline point of 98.0° F.

EXAMPLE 6

The 180°–400° F. portion of the product of Example 5 is catalytically reformed, using a conventional reforming catalyst and conventional reforming conditions, and is found to be a superior feedstock for this operation. The catalytic reformate is combined with the $C_5$—180° F. portion of the product of Example 5, to produce a gasoline pool. When $C_4$ hydrocarbons are blended into this gasoline pool in an amount sufficient to provide a pool Reid vapor pressure of 10, while conducting the reforming to provide a 91 F-1 clear pool octane number, the total gasoline pool is 58 liquid volume percent of the light cycle oil feedstock hydrocracked in Example 5. I.e., in this operation a 58 liquid volume percent yield, based on the hydrocracking zone feed, of a 91 F-1 clear gasoline having a Reid vapor pressure of 10, is obtained.

EXAMPLE 7

The 400° F.+ portion of the product of Example 5, characterized by a gravity of 30° API and by an aniline point of 98.0° F., is recycled to the catalytic cracking unit which produced the light cycle oil feed used in Example 5. This upgrades the total feed to the catalytic cracking unit, and causes decreased coke production and increased gasoline production in that unit. These improved results are made possible because of the improved characteristics of the 400° F.+ materials recycled from the hydrocracking zone to the catalytic cracking unit, compared with the approximately 400° F.+ light cycle oil supplied to the hydrocracking zone from the catalytic cracking unit:

|  | Gravity, ° API | Aniline point, ° F. |
|---|---|---|
| Feed to hydrocracking zone | 19.5 | 62 |
| 400° F.+ recycle from hydrocracking zone to catalytic cracking unit | 30 | 98 |

EXAMPLE 8

A catalyst prepared exactly as in Example 1, and having the same composition as the catalyst of Example 1, is used to hydrocrack another portion of the same light cycle oil hydrocarbon feedstock described in Example 5.

The hydrocracking is accomplished on a recycle basis, that is, with the 400° F.+ portion of the product being recycled to the hydrocracking zone, at an average catalyst temperature of 760° F., a total pressure of 2100 p.s.i.g., a liquid hourly space velocity of 0.9, and a total hydrogen supply rate of 5500 s.c.f. per barrel of hydrocarbon feedstock.

The product distribution is as follows:

Wt. percent
$C_1$ _____ 0.1
$C_2$ _____ 1.2
$C_3$ _____ 7.5
$iC_4$ _____ 9.6
$nC_4$ _____ 7.2
$C_5$—180° F. _____ 22.0
180°–400° F. _____ 57.0

The 180°–400° F. portion of the product is characterized by a gravity of 41° API and by a paraffin/naphthene/aromatic ratio of 17/31/52.

EXAMPLE 9

The 180°–400° F. portion of the product of Example 8 is catalytically reformed, using a conventional reforming catalyst and conventional reforming conditions, and is found to be a superior feedstock for this operation. The catalytic reformate is combined with the $C_5$—180° F. portion of the product of Example 8, to produce a gasoline pool. When $C_4$ hydrocarbons are blended into this gasoline pool in an amount sufficient to provide a pool Reid vapor pressure of 10, while conducting the reforming to provide a 91 F-1 clear pool octane number, the total gasoline pool is 105 liquid volume percent of the light cycle oil feedstock hydrocracked in Example 8. I.e., in this operation a 105 liquid volume percent yield, based on the hydrocracking zone light cycle oil feed, of 91 F-1 clear gasoline having a Reid vapor pressure of 10 is obtained.

EXAMPLE 10

A first bed of hydrocracking catalyst prepared exactly as in Example 1, and having the same composition as the catalyst of Example 1, is placed in a reactor. A second bed of catalyst is placed in the reactor above the first bed. The volume of the second bed is 25% of the total catalyst volume. The catalyst in the second bed, prepared by coprecipitation of metals and silica-alumina-titania gel, has the following composition:

| | Wt. percent |
|---|---|
| NiO | 12.7 |
| $WO_3$ | 12.6 |
| $SiO_2$ | 34.7 |
| $Al_2O_3$ | 30.0 |
| $TiO_2$ | 10.0 |
| Total | 100.0 |

Another portion of the same light cycle oil feedback described in Example 5 is passed downwardly through both catalyst beds in the reactor together with added hydrogen, the hydrogen and cycle oil sequentially contacting the catalyst beds, with no product or impurity removal between beds, at the following conditions:

| | |
|---|---|
| Average catalyst temperature, ° F. | 760 |
| Pressure, p.s.i.g. | 1300 |
| Hydrogen supply rate, SCF per barrel of hydrocarbon feedstock | 5600 |
| Liquid hourly space velocity of hydrocarbon feedstock through upper bed, v./v./hr. | 2.7 |
| Liquid hourly space velocity of hydrocarbon feedstock through lower bed, v./v./hr. | 0.9 |
| Per-pass conversion to products boiling below 400° F., liquid volume percent | 80.0 |

The portion of the product boiling above 400° F. is recycled to the reactor. The hydrogen consumption is 2700 SCF per barrel of hydrocarbon feedstock (fresh feedstock).

The product distribution of the 400° F.− product is as follows:

| | Wt. percent |
|---|---|
| $C_1$ | 0.3 |
| $C_2$ | 0.9 |
| $C_3$ | 4.0 |
| $iC_4$ | 5.4 |
| $nC_4$ | 4.3 |
| $C_5$—400° F. | 89.0 |

EXAMPLE 11

The 180°–400° F. portion of the product of Example 10 is catalytically reformed, using a conventional reforming catalyst and conventional reforming conditions, and is found to be a superior feedstock for this operation. The catalytic reformate is combined with the $C_5$–180° F. portion of the product of Example 10 to produce a gasoline pool. When $C_4$ hydrocarbons are blended into this gasoline pool in an amount sufficient to provide a pool Reid vapor pressure of 10, while conducting the reforming to provide a 91 F–1 clear pool octane number, the total gasoline pool is 117 liquid volume percent of the light cycle oil feedstock hydrocracked in Example 10. I.e., in this operation a 117 liquid volume percent yield, based on the fresh hydrocarbon feed to the reactor in Example 10, of a 91 F–1 clear gasoline having a Reid vapor pressure of 10, is obtained.

EXAMPLE 12

The run of Example 10 is repeated exactly, except using the actalyst of Example 1 unaccompanied in the reactor by a bed of hydrogenation catalyst. The average catalyst temperature needed to obtain the same per-pass conversion is 810° F., compared with 760° F. in Example 10, thereby indicating that the process of the present invention may be further improved by hydrotreating the feedstock prior to hydrocracking it in the presence of the ultrastable molecular sieve-containing catalyst of the present invention.

Although only specific embodiments of the present invention have been described, numerous variations can be made in these embodiments without departing from the spirit of the invention, and all such variations that fall within the scope of the appended claims are intended to be embraced thereby.

What is claimed is:
1. A hydrocarbon conversion catalyst consisting essentially of:
   (A) a gel matrix consisting essentially of:
      (a) a gel selected from silica-alumina gel, silica-alumina-titania gel and silica-alumina-zirconia gel, and
      (b) at least one hydrogenating component selected from Group VIII metals and compounds thereof and combinations of Group VIII metals and compounds thereof with tin and compounds thereof; and
   (B) A crystalline zeolitic molecular sieve substantially in the ammonia or hydrogen form, substantially free of any catalytic loading metal or metals, said molecular sieve further having a silica/alumina ratio above about 2.15, a unit cell size below about 24.65 angstroms and a sodium content below about 3 weight percent, calculated as $Na_2O$, said molecular sieve further being in particulate form and being dispersed through said matrix; said catalyst further being characterized by an average pore diameter below 100 angstroms and a surface area above 200 square meters per gram.

2. A catalyst as in claim 1, wherein said matrix contains at least 15 weight percent silica, and contains alumina in an amount providing an alumina-to-silica weight ratio of 15/85 to 80/20.

3. A catalyst as in claim 1, wherein said molecular sieve is present in an amount of 1 to 50 weight percent, based on said catalyst.

4. A catalyst as in claim 1, wherein said Group VIII hydrogenating component is present in an amount of 0.01 to 15 weight percent, preferably 0.01 to 10 weight percent, based on said catalyst and calculated as metal.

5. A catalyst as in claim 1, containing tin or a compound thereof, in an amount of 1 to 30 weight percent, based on said catalyst and calculated as metal.

6. A catalyst as in claim 1, containing at least 0.1 ml. $H_2O$ per gram of said molecular sieve.

7. A catalyst as in claim 1, wherein said matrix contains a silica-alumina-titania gel or a silica-alumina-zirconia gel, and wherein the titania or zirconia is present in an amount of 1 to 15 weight percent of said matrix, calculated as metal.

8. A catalyst consisting essentially of:
   (A) A porous Xerogel consisting essentially of:
      (a) at least 15 weight percent silica,
      (b) alumina, in an amount providing an alumina-to-silica weight ratio of 15/85 to 80/20,
      (c) nickel, in the form of metal, oxide, sulfide or any combination thereof, in an amount of 0.01 to 15 weight percent of said Xerogel, calculated as metal,
      (d) titanium oxide, in an amount of 1 to 10 weight percent of said Xerogel, calculated as metal;
   (B) A crystalline zeolitic molecular sieve, substantially in the ammonia or hydrogen form, substantially free of any catalytic loading metal or metals, in an amount of 1 to 50 weight percent of said catalyst, said molecular sieve further having a silica/alumina ratio above about 2.15, a unit cell size below about 24.65 angstroms and a sodium content below about 3 weight percent, calculated as $Na_2O$, said molecular sieve further being in the form of particles, said particles being dispersed through said Xerogel; said catalyst having an average pore diameter below 100 angstroms and a surface area above 200 square meters per gram.

9. A catalyst as in claim 8, containing at least 0.1 ml. $H_2O$ per gram of said molecular sieve.

10. A catalyst consisting essentially of:
(A) A porous Xerogel consisting essentially of:
(a) at least 15 weight percent silica,
(b) alumina, in an amount providing an alumina-to-silica weight ratio of 15/85 to 80/20,
(c) nickel, in the form of metal, oxide, sulfide or any combination thereof, in an amount of 0.01 to 15 weight percent of said Xerogel, calculated as metal,
(d) tin, in the form of metal, oxide, sulfide or any combination thereof, in an amount of 1 to 30 weight percent, calculated as metal and based on said catalyst;
(B) A crystalline zeolitic molecular sieve, substantially in the ammonia or hydrogen form, substantially free of any catalytic loading metal or metals, in an amount of 1 to 50 weight percent of said catalyst, said molecular sieve further having a silica/alumina ratio above about 2.15, a unit cell size below about 24.65 angstroms and a sodium content below about 3 weight percent calculated as $Na_2O$, said molecular sieve further being in the form of particles, said particles being dispersed through said Xerogel; said catalyst having an average pore diameter below 100 angstroms and a surface area above 200 square meters per gram.

11. A catalyst as in claim 10, further characterized by hydrocracking activities and stabilities developed therein by heating said catalyst in an oxygen-containing gas stream at temperatures in the range 900° to 1600° F. for 0.25 to 48 hours.

12. A catalyst as in claim 11, containing at least 0.1 ml. $H_2O$ per gram of said molecular sieve.

13. The method of activating a catalyst consisting essentially of:
(A) A porous Xerogel consisting essentially of:
(a) at least 15 weight percent silica,
(b) alumina, in an amount providing an alumina-to-silica weight ratio of 15/85 to 80/20,
(c) nickel, in the form of metal, oxide, sulfide or any combination thereof, in an amount of 0.01 to 15 weight percent of said Xerogel, calculated as metal,
(d) tin, in the form of metal, oxide, sulfide or any combination thereof, in an amount of 1 to 30 weight percent, calculated as metal and based on said catalyst;
(B) A crsytalline zeolitic molecular sieve, substantially in the ammonia or hydrogen form, substantially free of any catalytic loading metal or metals, in an amount of 1 to 50 weight percent of said catalyst, said molecular sieve further having a silica/alumina ratio above about 2.15, a unit cell size below about 24.65 angstroms and a sodium content below about 3 weight percent, calculated as $Na_2O$, said molecular sieve further being in the form of particles, said particles being dispersed through said Xerogel; said catalyst having an average pore diameter below 100 angstroms and a surface area above 200 square meters per gram; which method comprises heating said catalyst in an oxygen-containing gas stream at temperatures in the range 900° to 1600° F. for 0.25 to 48 hours.

14. The method as in claim 13, wherein said heating is accomplished at temperatures in the range 1200° to 1500° F. for 2 to 8 hours.

15. The method as in claim 13, with the addition to said catalyst following said heating of at least 0.1 ml. $H_2O$ per gram of said molecular sieve.

16. A hydrocracking process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrocracked products from said reaction zone.

17. A process as in claim 16, wherein the $H_2O$ content of said catalyst is maintained in an amount of at least 0.1 ml. $H_2O$ per gram of said molecular sieve during at least a major portion of the on-stream period.

18. A process as in claim 16, wherein said hydrocarbon feed contains 0.1 to 1000 p.p.m. nitrogen.

19. A process as in claim 16, wherein said reaction zone contains, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina.

20. A process as in claim 19, wherein said separate second catalyst is located in said reaction zone in a bed disposed above said catalyst containing a molecular sieve component.

21. A hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof and a component selected from the group consisting of alumina and silica-alumina, the catalyst of said second bed being the catalyst of claim 1, maintaining said first bed of catalyst and said second bed of catalyst at a temperature in the range 400° to 950° F. and a pressure in the range 800 to 3500 p.s.i.g. during said contacting, maintaining the total supply rate of hydrogen into said reactor shell from 200 to 20,000 s.c.f. of hydrogen per barrel of said feedstock, and recovering a gasoline product from the effluent from said second bed of catalyst.

22. A process as in claim 21, wherein the effluent from said second bed of catalyst is separated into fractions, including a light gasoline fraction, a heavy gasoline fraction, and a fraction boiling generally higher than said heavy gasoline fraction.

23. A process as in claim 22, wherein said heavy gasoline fraction is catalytically reformed.

24. A process as in claim 22, wherein said fraction boiling generally higher than said heavy gasoline fraction is catalytically cracked.

References Cited
UNITED STATES PATENTS

| | | | |
|---|---|---|---|
| 3,140,253 | 7/1964 | Plank et al. | 208—120 |
| 3,132,087 | 5/1964 | Kelley et al. | 208—60 |
| 3,236,762 | 2/1966 | Rabo et al. | 208—111 |
| 3,425,956 | 2/1969 | Baker et al. | 252—455 |

DELBERT E. GANTZ, Primary Examiner

A. RIMENS, Assistant Examiner

U.S. Cl. X.R.

208—111; 252—455